US009332271B2

(12) United States Patent
Chen et al.

(10) Patent No.: US 9,332,271 B2
(45) Date of Patent: May 3, 2016

(54) UTILIZING A SEARCH SCHEME FOR SCREEN CONTENT VIDEO CODING

(75) Inventors: Sijia Chen, Hangzhou (CN); Kai Li, Anhui (CN); Wayne Liu, Anhui (CN); Siping Tao, Anhui (CN)

(73) Assignee: Cisco Technology, Inc., San Jose, CA (US)

(*) Notice: Subject to any disclaimer, the term of this patent is extended or adjusted under 35 U.S.C. 154(b) by 1070 days.

(21) Appl. No.: 13/435,199

(22) Filed: Mar. 30, 2012

(65) Prior Publication Data

US 2013/0114704 A1     May 9, 2013

Related U.S. Application Data

(60) Provisional application No. 61/555,057, filed on Nov. 3, 2011.

(51) Int. Cl.
| | |
|---|---|
| *H04N 7/32* | (2006.01) |
| *H04N 19/557* | (2014.01) |
| *H04N 19/56* | (2014.01) |
| *H04N 19/533* | (2014.01) |

(52) U.S. Cl.
CPC ........... *H04N 19/557* (2014.11); *H04N 19/533* (2014.11); *H04N 19/56* (2014.11)

(58) Field of Classification Search
CPC ... H04N 19/557; H04N 19/54; H04N 19/583; H04N 19/57; H04N 19/537; H04N 19/533; H04N 19/56

USPC ............. 375/240.12, 240.16, 240.08, 240.09, 375/240.01
See application file for complete search history.

(56) References Cited

U.S. PATENT DOCUMENTS

| | | | | |
|---|---|---|---|---|
| 5,751,362 | A | * | 5/1998 | Lee .......................... 375/240.16 |
| 6,236,682 | B1 | * | 5/2001 | Ota et al. .................. 375/240.16 |
| 6,332,001 | B1 | * | 12/2001 | Arayashiki et al. ........... 375/240 |
| 6,417,888 | B1 | | 7/2002 | Dunn et al. |
| 2008/0170619 | A1 | | 7/2008 | Landau |
| 2010/0104021 | A1 | * | 4/2010 | Schmit ...................... 375/240.24 |
| 2011/0103482 | A1 | * | 5/2011 | Lee .......................... 375/240.16 |

* cited by examiner

*Primary Examiner* — David Harvey
*Assistant Examiner* — Naod Belai
(74) *Attorney, Agent, or Firm* — Edell, Shapiro & Finnan, LLC

(57) ABSTRACT

A method, a device and computer readable storage media facilitate providing screen content including a plurality of video frames that are displayed by a computing device. During coding of the screen content, a suitable predictor is found that is used to code pixel blocks from one or more frames. The suitable predictor is found by selecting a pixel block of a current frame, conducting a direction based search by comparing pixel blocks within a search window of a reference frame with the selected pixel block of the current frame to determine whether a match exists, and, in response to a determination that no sufficient match has been found, conducting a feature oriented search by comparing pixel blocks of the reference frame with the selected pixel block of the current frame to find a suitable match based upon a common feature.

18 Claims, 6 Drawing Sheets

UTILIZING A SEARCH SCHEME FOR SCREEN CONTENT VIDEO CODING

CROSS REFERENCE TO RELATED APPLICATIONS

This application claims priority from U.S. Provisional Application 61/555,057, entitled "Search Scheme for Screen Content Video Coding", and filed Nov. 3, 2011, the disclosure of which is incorporated herein by reference in its entirety.

TECHNICAL FIELD

The present disclosure relates to screen content or desktop sharing of content and coding of such shared content prior to transmission.

BACKGROUND

Desktop sharing has become an important feature in current collaboration software. It allows virtual meeting attendees to be viewing the same material or content (video, documents, etc.) during a discussion. To make desktop sharing possible, the screen content that is being shared by the sending computing device during a collaboration session must be continuously captured, encoded, transmitted, and finally rendered at receiving computing devices for display.

A hybrid video encoder is the most popular and the state of the art video encoder in current video coding. It consists of three major parts, predictive coding, transform coding and entropy coding. In predictive coding, a coding tool called inter-frame prediction (or motion-compensated prediction) is found to be efficient in compression due to the high temporal correlation in video signals. An inter-frame is a frame in a video compression stream that is expressed in terms of one or more previously decoded frames. Inter-frame prediction takes advantage of temporal redundancy between previously decoded frames to achieve higher compression efficiency in comparison to using neighboring pixels in the same frame. A search module is used to ensure the efficiency of inter-frame prediction, where a search can be conducted to find a decent predictor block of pixels that is useful for coding the current block of pixels.

Choosing an appropriate search module for a hybrid video encoder is important since the search result will substantially affect the compression efficiency of the encoder, and further since the cost of the search scheme itself can be computationally expensive. Two types of search schemes that are typically utilized are a full search and a fast search.

A full search is a method that examines all the candidate positions in a search window (i.e., a portion of a reference frame) to find the best predictor for inter-frame prediction (where the best predictor is the predictor that can produce the least residual after inter-frame prediction). The full search is a complicated and exhaustive search that may provide the best inter-frame prediction but also requires the most computations and is too slow for many real-time applications.

A fast search is a method of checking selective candidate positions in the search window to find the best predictor. Some examples of known fast searches include a diamond search, a hexagonal search, etc. The fast search can provide a fast computation. However, the performance of the fast search is typically not as reliable as the full search in that it presents the potential risk of missing the best predictor.

The search module algorithm is significant to encoding efficiency when a hybrid video encoder is applied to encode screen content. For example, when a hybrid video encoder is taking screen content as input, inter-frame prediction can be exploited to reduce inter-frame redundancy in displaced content. For newly appearing content, the search can also be used to find similar content as the predictor. One feature of screen content video that has been determined by observation is that screen content video typically contains similar patterns which can be used in prediction. For newly appearing content, when the predictor can lead to efficient inter-frame prediction, bit-consumption can be greatly decreased in comparison to intra-frame prediction (which can be inefficient for some screen content).

The overall screen content resolutions can be significantly large, such that a full search calculation would be very complex and time consuming. Thus, fast searching is desirable over full searching for encoding screen content. However, conventional fast search methods are designed based upon camera video features rather than screen content features. Utilizing such conventional fast search methods for screen content can yield undesirable results.

A desirable search scheme for encoding screen content during desktop sharing should be able to find a reasonably good predictor for inter-frame prediction for a current block of content while not requiring a significant number of computations.

DESCRIPTION OF EXAMPLE EMBODIMENTS

Overview

A method, a device and computer readable storage media facilitate providing screen content comprising a plurality of video frames that are displayed by a computing device. During coding of the screen content, a suitable predictor is found that is used to code pixel blocks from one or more frames. The suitable predictor is found by selecting a pixel block of a current frame, conducting a direction based search by comparing pixel blocks along at least one predetermined direction within a search window of a reference frame with the selected pixel block of the current frame to determine whether a match exists between a pixel block of the reference frame and the selected pixel block of the current frame, and, in response to a determination that no sufficient match has been found between any pixel block within the search window of the reference frame and the selected pixel block of the current frame from the direction based search, conducting a feature oriented search by comparing pixel blocks of the reference frame with the selected pixel block of the current frame to determine whether a match exists between any pixel block of the reference frame having a feature with a value that is within a predetermined range of a value of the same feature for the selected pixel block of the current frame.

Example Embodiments

A hybrid video encoder is utilized to encode screen content, e.g., content associated with video data presented on a display screen, such as content that is captured and shared during a video/collaboration session involving two or more different computing devices. Efficient inter-frame prediction is achieved utilizing the techniques described herein without the expense of high computational complexity for screen content video coding. While the techniques described herein are applicable for encoding desktop sharing content, e.g., for applications in a collaboration session between two or more computing devices, the techniques also applicable in any video encoding scheme associated with screen content video (such as computer generated video, as well as screen content combined with camera video).

Figure 1:
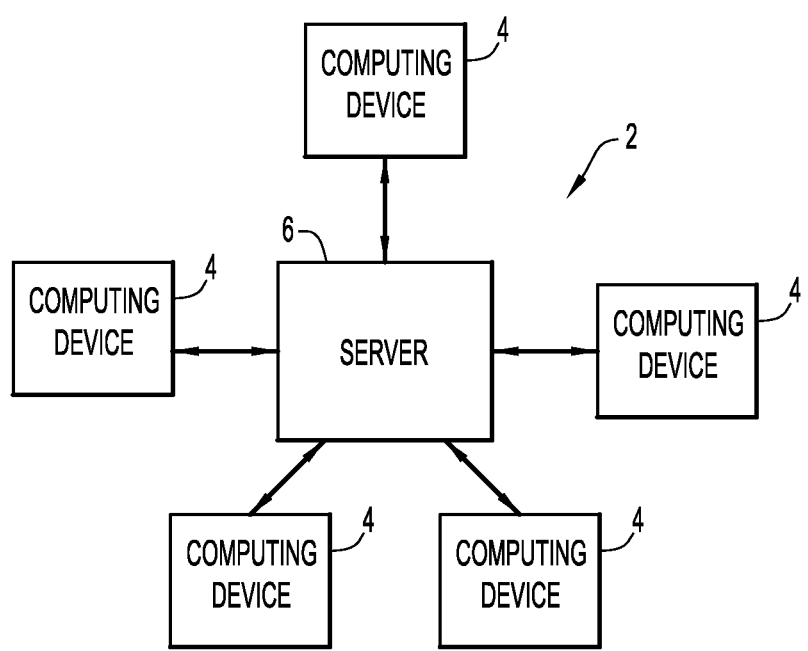
FIG. 1 is a schematic block diagram of an example system in which computing devices are connected to facilitate a collaboration session between the devices including desktop sharing from one device to one or more other devices.

Referring to FIG. 1, a block diagram is shown for an example system that facilitates collaboration sessions between two or more computing devices, where a collaboration session includes desktop sharing of desktop content displayed by one computing device to other computing devices of the system. A collaboration session can be any suitable communication session (e.g., instant messaging, video conferencing, remote log-in and control of one computing device by another computing device, etc.) in which audio, video, document, screen image and/or any other type of content is shared between two or more computing devices. The shared content includes desktop sharing, in which a computing device shares its desktop content (e.g., open documents, video content, images and/or any other content that is currently displayed by the computing device sharing the content) with other computing devices in a real-time collaboration session. In other words, desktop sharing during a real-time collaboration session allows other computing devices to receive and display, at substantially the same time (or with a minimal or slight time delay), the same content that is being displayed at the computing device sharing such content.

The system 2 includes a communication network that facilitates communication and exchange of data and other information between two or more computing devices 4 and a server device 6. The communication network can be any suitable network that facilitates transmission of audio, video and other content (e.g., in data streams) between two or more devices connected with the system network. Examples of types of networks that can be utilized include, without limitation, local or wide area networks, Internet Protocol (IP) networks such as intranet or internet networks, telephone networks (e.g., public switched telephone networks), wireless or mobile phone or cellular networks, and any suitable combinations thereof. While FIG. 1 depicts five computing devices 4 connected with a single server device 6, this is for example purposes only. Any suitable number of computing devices 4 and server devices 6 can be connected within the network of system 2 (e.g., two or more computing devices can communicate via a single server device or any two or more server devices)

While the embodiment of FIG. 1 is described in the context of a client/server system, it is noted that content sharing and screen encoding utilizing the techniques described herein are not limited to client/server systems but instead are applicable to any content sharing that can occur between two computing devices (e.g., content sharing directly between two computing devices).

Figure 2:
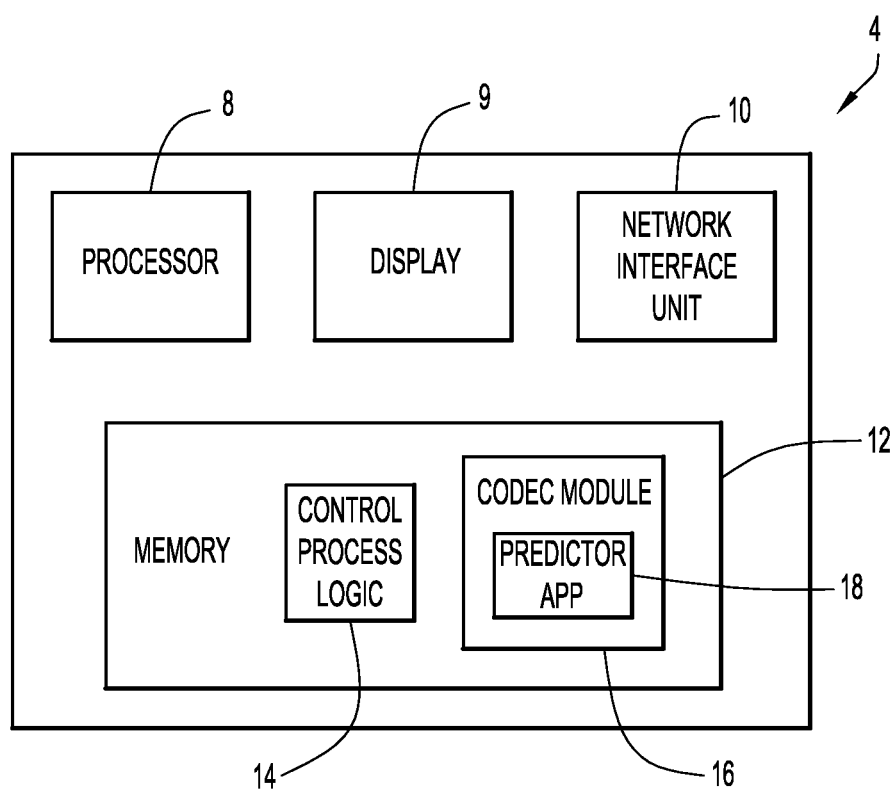
FIG. 2 is a schematic block diagram of an example computing device configured to engage in desktop sharing with other devices utilizing the system of FIG. 1.

A block diagram is depicted in FIG. 2 of an example computing device 4. The device 20 includes a processor 8, a display 9, a network interface unit 10, and memory 12. The network interface unit 10 can be, for example, an Ethernet interface card or switch, a modem, a router or any other suitable hardware device that facilitates a wireless and/or hardwire connection with the system network, where the network interface unit can be integrated within the device or a peripheral that connects with the device. The processor 8 is a microprocessor or microcontroller that executes control process logic instructions 14 (e.g., operational instructions and/or downloadable or other software applications stored in memory 12). The display 9 is any suitable display device (e.g., LCD) associated with the computing device 4 to display video/image content, including desktop sharing content and other content associated with an ongoing collaboration session in which the computing device 4 is engaged.

The memory 12 can include random access memory (RAM) or a combination of RAM and read only memory (ROM), magnetic disk storage media devices, optical storage media devices, flash memory devices, electrical, optical, or other physical/tangible memory storage devices. The processor 8 executes the control process logic instructions 14 stored in memory 12 for controlling each device 4, including the performance of operations as set forth in the flowcharts of FIGS. 3-5. In general, the memory 12 may comprise one or more (non-transitory) computer readable storage media (e.g., a memory device) encoded with software comprising computer executable instructions and when the software is executed (by the processor 8) it is operable to perform the operations described herein in connection with control process logic instructions 14. In addition, memory 12 includes an encoder/decoder or codec module 16 (e.g., including a hybrid video encoder) that is configured to encode or decode video and/or other data streams in relation to collaboration sessions including desktop sharing in relation to the operations as described herein. The encoding and decoding of video data streams, which includes compression of the data (such that the data can be stored and/or transmitted in smaller size data bit streams) can be in accordance with H.264/MPEG-4 AVC (advanced video coding) or any other suitable format. The codec module 16 includes a predictor application 18 that is used during encoding to find one or more pixel blocks of a reference frame that are acceptable predictors for encoding pixel blocks of other frames within a video data stream.

Each server device 6 can include the same or similar components as the computing devices 4 that engage in collaboration sessions. In addition, each server device 6 includes one or more suitable software modules (e.g., stored in memory) that are configured to provide a platform for facilitating a connection and transfer of data between multiple computing devices during a collaboration or other type of communication session. Each server device can also include a codec module for encoding and/or decoding of a data stream including video data and/or other forms of data (e.g., desktop sharing content) being exchanged between two or more computing devices during a collaboration session.

Some examples of types of computing devices that can be used in system 2 include, without limitation, stationary (e.g., desktop) computers, personal mobile computer devices such as laptops, note pads, tablets, personal data assistant (PDA) devices, and other portable media player devices, and cell phones (e.g., smartphones). The computing and server devices can utilize any suitable operating systems (e.g., Android, Windows, Mac OS, Symbian OS, RIM Blackberry OS, Linux, etc.) to facilitate operation, use and interaction of the devices with each other over the system network.

Figure 3:
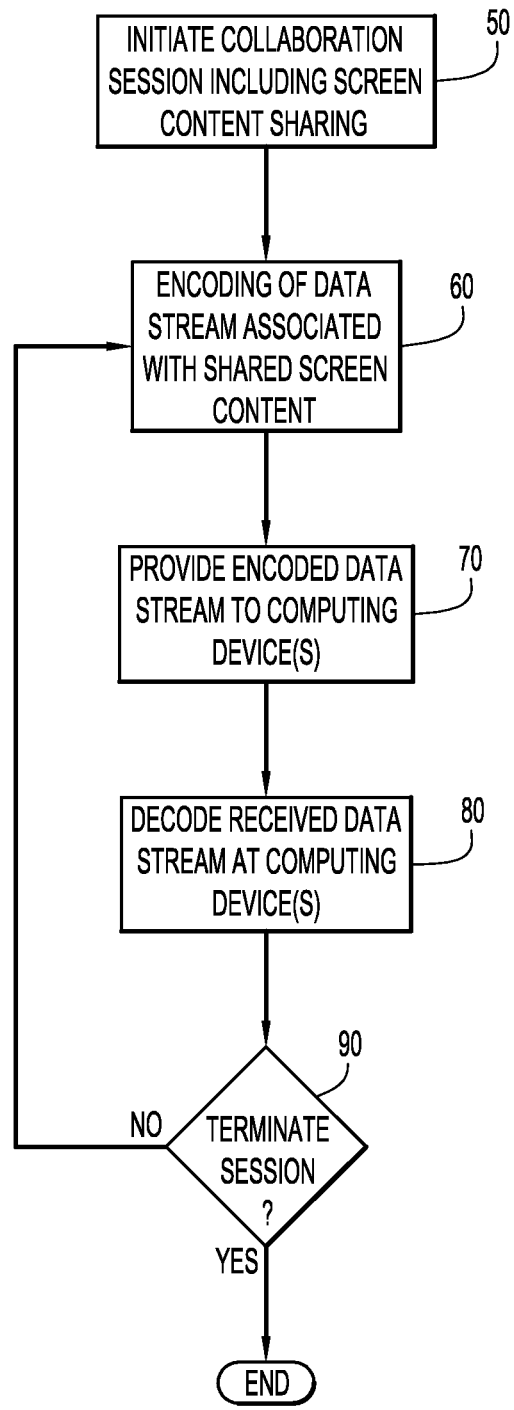
FIG. 3 is a flow chart that depicts an example process for performing a collaboration session between computing devices in accordance with embodiments described herein.
Figure 4:
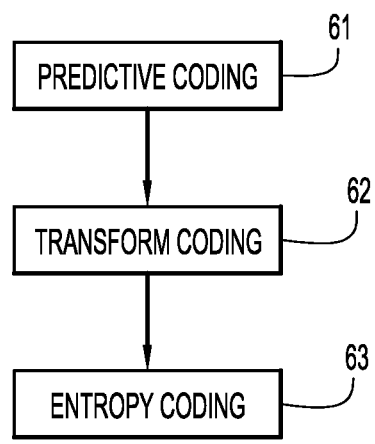
FIGS. 4 and 5 are flow charts depicting an example hybrid video encoding process for encoding screen content for the process of FIG. 3.

System operation, in which a collaboration session including screen content sharing is established between two or more computing devices, is now described with reference to the flowcharts of FIGS. 3-5. Referring to FIG. 3, at 50, a collaboration session is initiated between two or more computing devices 4 over the system network, where the collaboration session is facilitated by one or more server device(s) 6. During the collaboration session, a computing device 4 shares its screen content or desktop content (e.g., some or all content that is displayed by the sharing computing device) with other computing devices 4, where the shared content is communicated from the sharing device 4 to other devices 4 via any server device 6 that facilitates the collaboration session. Alternatively, as previously noted, the screen content can be directly shared between two computing devices with no server between the computing devices. At 60, the data stream associated with the shared screen content, which includes video data, is encoded in accordance with the method depicted in FIG. 4. The encoding of the data can be performed utilizing the codec module 16 of the screen content sharing computing device 4 and/or a codec module 16 of one or more server devices 6. At 70, the encoded data stream is provided, via the network, to the other computing devices 4 engaged in the collaboration session. Each computing device 4 that receives the encoded data stream utilizes its codec module 16, at 80, to decode the data stream for use by the device 4, including display of the shared screen content via the display 9. The encoding of data streams transmitted by the sharing device 4 and decoding of such data streams by the receiving device(s) continues until termination of the collaboration session at 90.

The data encoding that is performed at 60 includes a video encoding of screen content that utilizes a hybrid video encoder to continuously capture, encode, and transmit the shared screen content so that it can be efficiently displayed at receiving computing devices. The hybrid video encoder is implemented as part of the codec module 16 of each device 4, 6. Referring to FIG. 4, the process of hybrid video encoding includes, at 61, predictive coding, at 62, transform coding, and at 63, entropy coding. The predictive coding, which is described in further detail herein reference to the flow chart of FIG. 5, utilizes a fast search inter-frame prediction implemented by the predictor application 18 of the codec module 16 to determine the best predictor block to use within a window of a series of frames. Once a suitable predictor block is found from the search, a comparison of blocks of a current or candidate frame is made with the reference frame to determine whether such blocks are the same or sufficiently similar such that a single block of pixels that corresponds to two or more frames can be used for coding. The transform coding and entropy coding can utilize any conventional or other suitable techniques to perform the coding of the data stream based upon the blocks of data that have been chosen for coding by the predictive coding process.

Figure 6:
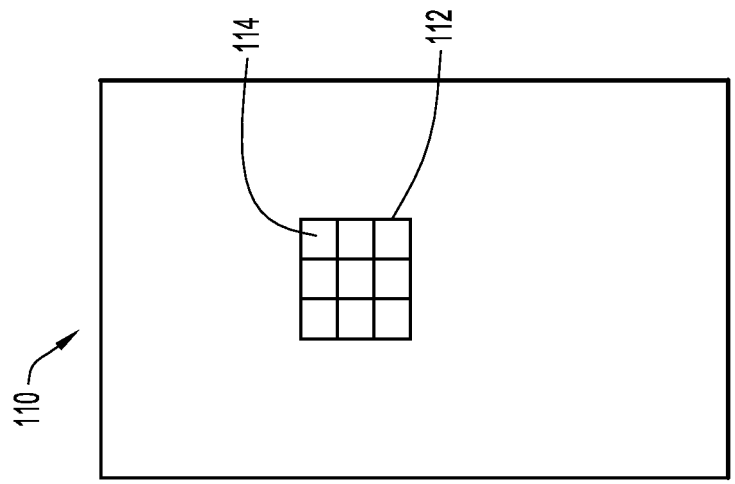
FIG. 6 is a schematic diagram depicting a reference frame and a current frame, in which pixel blocks within a window of the reference frame are compared with a selected pixel block of the current frame.
Figure 6:
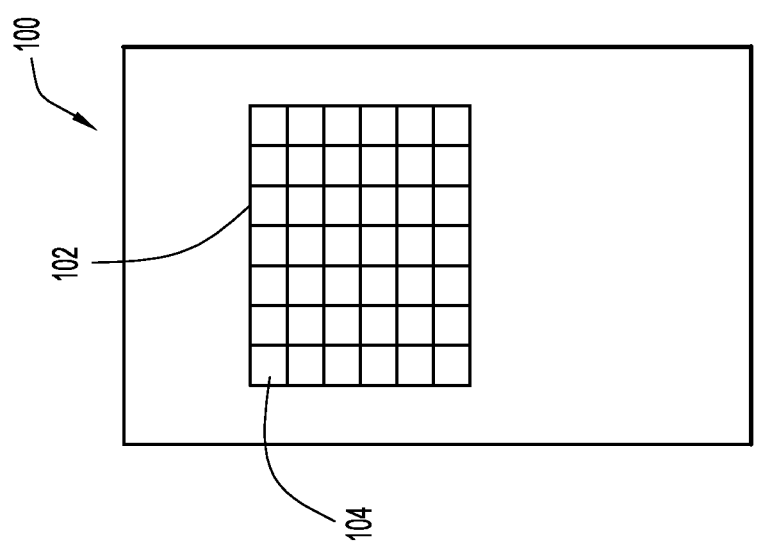

The predictive coding process comprises a fast search to find a suitable block within a window of a reference frame that serves as a best predictor for a block within a current frame, where the pixels in the current block and the best predictor block will be the same or have the greatest similarity. A schematic representation is depicted in FIG. 6 of a reference frame 100 and a current frame 110 (e.g., a current frame n and a reference frame n–1). In the reference frame 100, a search window 102 of pixels 104 is utilized to search for a suitable pixel block that provides the best match for a selected block of pixels 114 in the current frame 110. While the pixel block 112 for the current frame 110 is shown to have an area of 3×3 pixels 114, the pixel block to be analyzed in any frame can be of any suitable and predetermined dimensions. The size of the search window 102 for the reference frame 100 shown in FIG. 6 is for example purposes only, and it is noted that a search window can be of any designated size. Further, a reference frame may also include any selected number of search windows (e.g., two or more). Candidate pixel blocks are designated in the window 102 of the reference frame 100 based upon the size of the selected pixel block 112 as well as particular search criteria utilized to find the best matching pixel block within the window 102.

Figure 5:
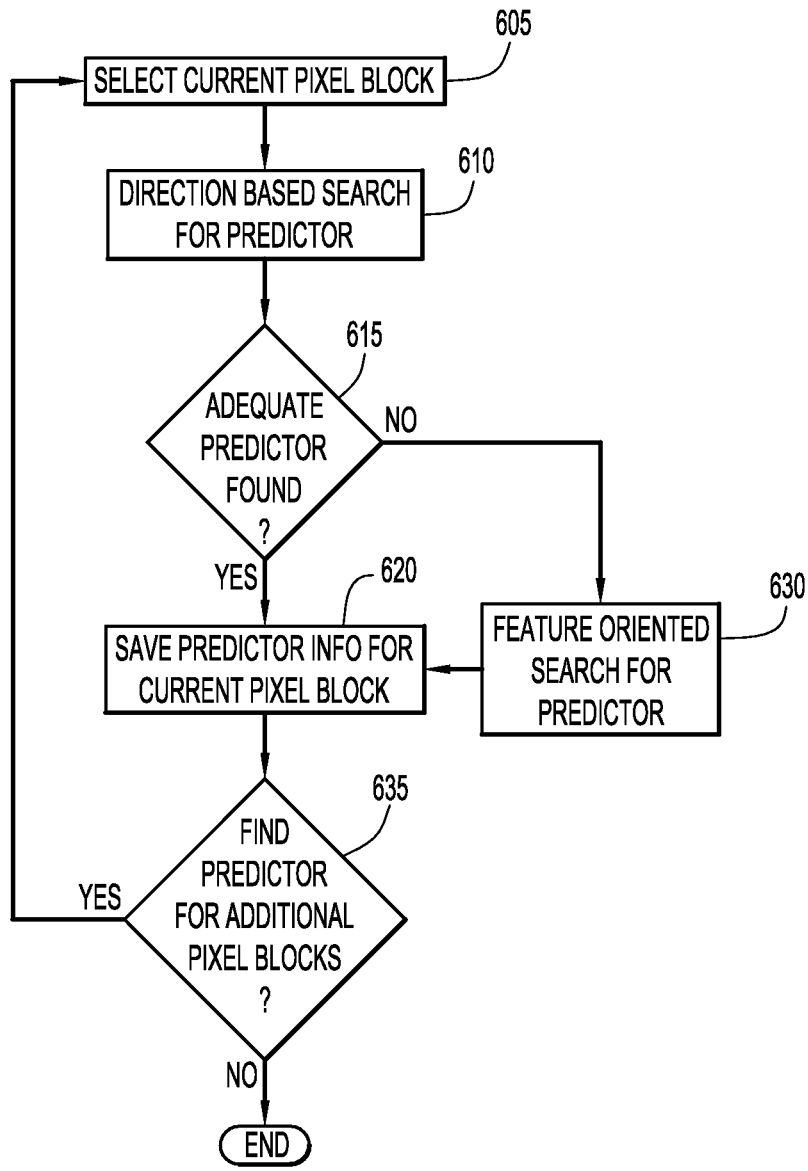

Referring to FIG. 5, the search scheme for finding the best predictor block within a window in a reference frame includes a direction based search for the predictor block and, if necessary, a feature oriented search for the predictor block. Reference is also made to FIG. 6 for the description of the flow chart of FIG. 5.

At 605, a pixel block within a current frame of interest (e.g., pixel block 112 of current frame 110) is selected for comparison with pixel blocks in a search window of a reference frame (e.g., window 102 of reference frame 100). A search is conducted of pixel blocks within the search window of the reference frame, where the pixel blocks in the search window of the reference frame are compared with the selected pixel block of the current frame in order to find a decent predictor. The reference frame can be selected in any suitable manner. For example, the reference frame can be a previous frame that is immediately prior to or spaced any suitable number of frames from the current frame. In addition, the search window within the reference frame can also be determined in any suitable manner.

A direction based search is first initiated for the predictor at 610. The direction based search traces directional movements of blocks of pixels between frames of the screen content. Directional movement is detected by comparing candidate blocks along one or more predetermined directions within the search window of the reference frame with the selected pixel block in current frame in order to determine whether the current block includes pixels that are moving from frame-to-frame along the direction of movement. The search can occur in one direction or in two or more different directions. In an example embodiment, a direction based search proceeds from a previous pixel block in the reference frame that has already been compared with the selected pixel block of the current frame to the next, successive pixel block shifted in the predetermined direction of the reference frame (i.e., the next successive pixel block that is shifted in the predetermined direction in relation to the previous pixel block that has already been compared with the selected pixel block of the current frame).

For example, consider a directional movement detection search for moving pixel blocks within a number of frames, where a pixel block is defined having a selected size (e.g., a predetermined array of pixels) within a specified search window of each frame. A block covering a predetermined area (i.e., a selected number of pixels in x and y directions) and located at a position $(x_{n-1}, y_{n-1})$ in frame n–1 (where the coordinates of the pixel block can referenced by any suitable location within the block, e.g., by left-most and top-most pixel location within the block) may be identified and matched with an identical block covering the same predetermined area and at position $(x_n, y_n)$ in frame n. In this scenario, a pixel block has been found to have moved, where the pixel block's movement between frame n–1 and frame n is directional.

The direction based search attempts to identify moving pixel blocks between frames and then trace the directional movements between the reference frame and the current frame. By doing this, the same pixel blocks within multiple frames need only be encoded a single time, with reference to the location of the same pixel blocks within different frames being determined based upon the detected direction of movement of the pixel blocks between frames.

A cross search can be used as the direction-based search in order to generate results used to determine whether the direction-based search is a good enough predictor for coding of the frames of the screen content. Cross searching comprises searching in both vertical and horizontal directions of a frame during the direction-based search, where the search for matching pixel blocks proceeds in the same predetermined vertical direction and the same predetermined horizontal direction. Without additional prior-information, horizontal and vertical movements are typical and common in screen content that is shared during a collaboration session. There are also other ways to gain additional prior-information of the directional movements that may occur within the frames of shared content. For example, scrolling and window movements, which are common in screen content, can be detected by preprocessing or achieved from information obtained during system operation. In the event such additional prior-information is known, the direction-based search can utilize this information to conduct a direction based search in some other manner instead of a cross search.

Cross-searching of targets that may be good predictors involves finding pixel blocks having movements that are horizontal and/or vertical between frames. For example, suppose the position of a pixel block in a current frame n being examined is $(x_n, y_n)$. The current frame is compared to the reference frame (e.g., frame n−1), where all pixel block positions covered in the following set need to be searched within a specified window of the reference frame (e.g., the window may be an anticipated area within the reference frame where the same pixel block would be located):

$$\{(x_{ref}, \text{all\_y\_in\_search\_window}_{ref}), (\text{all\_x\_in\_search\_window}_{ref}, y_{ref})\}$$

Fast algorithms such as early-termination can also be combined into the direction-based search. Some example fast algorithms include, without limitation, selectively choosing search candidate pixel blocks along more than one direction (e.g., along each direction of interest), discarding a particular direction at any selected time during the search (e.g., based upon information gained during the search), and utilizing a predetermined early-termination threshold to end the search before all the candidates are evaluated. At 615, it is determined whether an adequate or suitable predictor has been found utilizing the direction based search. For example, utilizing cross searching and/or any other prior information based searching, the predictor application 18 of the codec module 16 determines whether a suitable predictor has been found, such as one or more pixel blocks within one or more specified windows of a reference frame have been found to be a sufficient match (e.g., identical or of sufficient similarity) with pixel blocks in other frames of the set N and a direction of movement of such pixel blocks has been identified between the reference frame and the other frames.

Since the closest matching candidate blocks of the reference frame will likely not be identical in content as the selected pixel block of the current frame, an index value can be utilized to determine a predictor efficiency for a candidate pixel block in the reference frame and the selected pixel block of the current frame. When a determined index value is deemed to be acceptable (e.g., it meets, exceeds or falls within a threshold value range), the candidate block associated with this index value is designated as the predictor that matches the selected block of the current frame. In particular, a determined index value can be deemed acceptable based upon a comparison of pixel values between a candidate pixel block of the reference frame and corresponding pixel values of the selected pixel block of the current frame, where a difference between pixel values of the candidate pixel block of the reference frame and the pixel block of the current frame falls below a predetermined threshold value or within a predetermined range of values.

An example of a suitable index value is the sum of absolute differences (SAD) between the selected block of the current frame and a candidate block of the reference frame, where a sufficiently small difference (e.g., within a threshold value range) indicates that the candidate block is a suitable predictor for the selected block of the current frame. The sum of absolute differences (SAD) refers to taking the absolute difference between each pixel in a selected block and each corresponding pixel in a candidate block that is being used for comparison, and then summing the absolute differences to obtain an SAD value. Other index values can also be used to determine how similar a candidate block of the reference frame is to the selected block of the current frame including, without limitation, sum of absolute transformed differences (SATD).

In the event the direction based search has been determined as being acceptable, the predictor information (e.g., which pixel block or blocks of the current frame are considered a match with a pixel block or pixel blocks within the search window of the reference frame, and also a direction of movement of such pixel block(s) within the current frame based upon a change in coordinate location of the matching pixel block(s) of the reference frame and the corresponding pixel block(s) of the current frame) is saved at 620 for the current frame (e.g., saved within memory 12).

In the event the direction based search has been determined as inadequate, a feature oriented search is invoked by the predictor application 18 of the codec module 16 at 630. As used herein, term "feature" means characteristics of video content within the frames including, without limitation, average pixel values, texture, contrast, and motion within frames. In a feature oriented search, search order or possible thresholds of the search can be determined according to the result of a feature analysis. For example, for a search order, candidate pixel blocks within the search window of the reference frame (e.g., defined pixel blocks within search window 102 of reference frame 100) that have features considered to be suitably similar to the selected pixel block of the current frame (e.g., pixel block 112 of current frame 110) can be checked first during the searching, since the best predictor should be similar in feature to the current block.

A feature index is used to provide a quantitative description of the feature similarity between a candidate block of a reference frame and a block of a current frame being analyzed. A feature index (described in further detail herein) is calculated, and then a feature oriented search for a predictor is conducted. The feature index calculation can be performed at part of the feature oriented search at 630 (e.g., at the block level of analysis) or, alternatively, prior to conducting the feature oriented search (e.g., at the time frame level of analysis, when a current frame is utilized to select one or more pixel blocks for analysis). In the feature oriented search, a search order for features is initially determined based upon the calculated feature index. Since the feature index is designed to represent similarity between blocks, the search should begin with candidate pixel blocks of the reference frame that have higher similarity to the pixel block of the current frame in relation to other candidate pixel blocks of the reference frame. An early-termination decision can be made to achieve better compression efficiency. Candidate pixel blocks with a certain feature index that is deemed as poor can be classified as inefficient and worthless predictors, and therefore rejected for a better computation complexity by the codec module 16. A candidate pixel block within the search window of the reference frame that has a feature value that is within a selected or predetermined range of the feature value for the selected pixel block of the current frame may be considered as suitable for further consideration. For candidate pixel blocks having feature values that are considered suitably similar to the selected pixel block of the current frame, the candidate pixel block having a feature value that is closest to the feature value of the selected block of the current frame may be considered the best predictor.

The feature index is a mathematical description calculated by the difference between a reference candidate pixel block of the reference frame and the selected pixel block of the current frame. The feature index is utilized to describe features of the blocks, such as motion, texture and contrast. The selection of the feature index can utilize the following aspects: (1) the effectiveness of the feature index in representing the feature similarity between candidate pixel block of the reference frame and the selected pixel block of the current frame; (2) the computational burden of calculating the feature index; and (3) the increase in search efficiency after applying the feature index. For (3), one approach is early termination, since the feature oriented search includes the possibility of early termination (i.e., when the feature difference between candidate pixel blocks of the reference frame and the selected pixel block of the current frame is large, further search will become inefficient).

In an example embodiment, the average luminance of a pixel block may be taken as a "feature". The difference between sums of the block (SD) may be taken to be a feature index, since the average luminance of the block can be indicated by the average pixel value of the block or the sum of the block. The difference between sums of the block (SD) refers to the sum of the differences between pixel values of the candidate pixel block of the reference frame and the selected pixel block of the current frame (e.g., adding all the pixel values together from the candidate block of the reference frame and subtracting from the sum of pixels of the selected block for the current frame, or also as shown in the equation for SD below). It is noted that the final SD value will be an absolute value of the difference. For this feature index, effectiveness can be verified by the determined compression efficiency achieved utilizing this technique as compared to a full search. To determine search order, the reference candidates with smaller SD values will be checked before reference candidates with larger SD values (i.e., a candidate pixel block of the reference frame having a first SD value that is less than a second SD value of another candidate pixel block of the reference frame will be checked as a potential predictor for the selected pixel block of the current frame prior to the other candidate pixel block).

By calculating the feature index prior to encoding of a current frame, which can be accelerated by SIMD (Single Instruction Multiple Data) instructions of assembly, the computational burden of the computation can be greatly reduced.

One aspect in the design of the feature oriented search is to combine early termination with feature index and the cost criteria associated with the search. The difference between sums of the block (SD) when used as feature index and sum of absolute difference (SAD) can be used as the cost criteria. When the next candidate pixel block of the reference frame has a calculated SD value that is greater than the current minimum SAD (where the current minimum SAD value is the lowest calculated SAD value between a reference pixel block and the selected pixel block of the current frame up to the point at which the next candidate pixel block of the reference frame is being compared with the selected pixel block of the current frame), the condition of early termination is met for this candidate pixel block. This is because the reference candidate pixel blocks with a larger SD than current minimum SAD can be safely ignored without any degradation to the search efficiency. This is based on the mathematical fact that SD will not be larger than SAD between the reference candidate pixel block and the selected pixel block of the current frame, as shown in the following equation:

$$\sum_{i \in block} d_i \leq \sum_{i \in block} |d_i|,$$

$$SD = \sum_{i \in block} d_i, SAD = \sum_{i \in block} |d_i|$$

where $d_i$ stands for the difference between the pixel value in the reference frame and the corresponding pixel value in the current frame (i.e., the pixel value in the current frame that corresponds in location with the pixel value in the reference frame). It is further noted that the overall SD value is an absolute value (so as to be the same value regardless of whether reference candidate pixel block values are subtracted from pixel block values of the current frame or vice versa). The sum of absolute difference (SAD) is a commonly used cost criteria in the search module of conventional hybrid video encoders.

A non-limiting example of an early termination strategy utilizes a threshold SD_Threshold. Since the search starts with candidates with smaller SD values, when the current point to be calculated has a larger SD value than SD_Threshold, the condition for early termination is met. Thus, a larger SD_Threshold value correlates with a longer search. The early termination strategy described herein can function independently from the previously described process of comparing the SD of reference candidates with a current minimum SAD. When either condition of these two criteria is met, the search process ends.

The definition of the SD_Threshold can be as follows:

$$SD\_Threshold = \begin{cases} Qstep_{ref} * \alpha * aa, & \text{when } (n_{SD0} <= a) \\ Qstep_{ref} * \alpha * bb, & \text{when } (a < n_{SD0} <= b) \\ Qstep_{ref} * \alpha * cc, & \text{when } (b < n_{SD0} <= c) \\ Qstep_{ref} * \alpha * dd, \text{ and number of maximum search point is limited to } m, & \text{when } (n_{SD0} > c) \end{cases}$$

where:

$Qstep_{ref}$ refers to the quantization level of the reference frame;

$\alpha$ is the complexity controller (this parameter can be used to control the allowed computational complexity; for example, an $\alpha$ parameter of 2 will allow more searching than an α value of 1, which also means the computational complexity will be greater and the predictors will be better);

aa,bb,cc,dd are scaling factors; these parameters reflect a balance between a different range of $n_{SD0}$; in an example scenario, aa>bb>cc>dd, where aa=2, bb=1, cc=¼, dd=0, combined with α=1 or 8, the multiplier of $Qstep_{ref}$ will be (2,1,¼,0) or (16,8,2,0);

m is the search point limitation, which can be a fixed value or related to α;

$n_{SD0}$ refers to the number of reference block/search points whose SD=0 with the current block;

a, b, c are parameters to define the range of $n_{SD0}$, which can be preset values or related to search window; for example, when the search window has a square configuration of the size searchwindow_width*searchwindow_width, the following values can be applied for a, b, c:

$$\begin{cases} a = 50, & \text{(preset)} \\ b = 500, & \text{(preset)} \\ c = \left(\frac{1}{200}\right)*(\text{searchwindow\_width}*\text{searchwindow\_width}), & \text{(related to search window size)} \end{cases}$$

Upon finding a suitable predictor for the feature oriented search, the predictor information is saved (e.g., in memory 12) for use in the encoding process of the frames.

At 635, a determination can be made whether to search for a predictor of another frame (e.g., another pixel block within the current frame, or a selected pixel block of another frame). In the event a predictor for another pixel block of a frame is desired, the process is again repeated starting at 605.

Thus, the search scheme for finding predictors for matching (e.g., identical or suitably similar) pixel blocks within a search window of a reference frame with pixel blocks of other frames for video content (e.g., screen content associated with screen content sharing during a collaboration session) as described herein enhances the overall screen encoding efficiency with reduced computational complexity in relation to full searching and/or other methods that are typically employed for screen content coding. The techniques described herein are further useful for H.264 encoding and can be applied to any pixel block size for motion compensation.

The above description is intended by way of example only.

What is claimed is:

1. A method comprising:
   providing screen content comprising a plurality of video frames that are displayed by a computing device; and
   during coding of the screen content, finding a suitable predictor that is used to code pixel blocks from one or more frames, wherein the finding of the suitable predictor comprises:
   selecting a pixel block of a current frame;
   conducting a direction based search by comparing pixel blocks along at least one predetermined direction within a search window of a reference frame with the selected pixel block of the current frame to determine whether a match exists between a pixel block of the reference frame and the selected pixel block of the current frame; and
   in response to a determination that no sufficient match has been found between any pixel block within the search window of the reference frame and the selected pixel block of the current frame from the direction based search, conducting a feature oriented search by comparing pixel blocks of the reference frame with the selected pixel block of the current frame to determine whether a match exists between any pixel block of the reference frame having a feature with a value that is within a predetermined range of a value of the same feature for the selected pixel block of the current frame, wherein conducting the feature oriented search further comprises:
   determining a sums of block (SD) value for pixel blocks within the reference frame, wherein each SD value for a pixel block of the reference frame comprises an absolute value of a difference between a sum of pixel values in the reference block and a sum of pixel values in the selected pixel block of the current frame, and each pixel value is a quantified value of a feature for the pixel associated with the pixel value; and
   ordering the feature oriented search within the reference frame so as to compare pixel blocks of the reference frame having lower SD values with the selected pixel block of the current frame prior to comparing pixel blocks of the reference frame having higher SD values with the selected pixel block of the current frame.

2. The method of claim 1, further comprising:
   establishing a collaboration session between a first computing device and a second computing device, wherein the first computing device shares the screen content with the second computing device.

3. The method of claim 1, wherein the direction based search comprises a search along at least one predetermined directions within the search window of the reference frame.

4. The method of claim 1, wherein a match is determined to exist during the direction based search based upon a comparison of pixel values between a candidate pixel block of the reference frame and corresponding pixel values of the selected pixel block of the current frame, where a difference between pixel values of the candidate pixel block of the reference frame and the pixel block of the current frame falls within a predetermined range of values.

5. The method of claim 1, wherein each pixel value comprises a luminance value of the pixel associated with the pixel value.

6. The method of claim 1, wherein the feature oriented search is terminated when at least one pixel block of the reference frame is reached during the ordered search that has a SD value greater than a threshold value.

7. An apparatus comprising:
   a memory configured to store instructions including a predictor application; and
   a processor configured to execute and control operations of the predictor application so as to:
   find a suitable predictor that is used to code pixel blocks from one or more frames in a plurality of video frames of screen content that is displayed by the apparatus, wherein the finding of the suitable predictor comprises:
   selecting a pixel block of a current frame;
   conducting a direction based search by comparing pixel blocks along at least one predetermined direction within a search window of a reference frame with the selected pixel block of the current frame to determine whether a match exists between a pixel block of the reference frame and the selected pixel block of the current frame; and in response to a determination that no sufficient match has been found between any pixel block within the search window of the reference frame and the selected pixel block of the current frame from the direction based search, conducting a feature oriented search by comparing pixel blocks of the reference frame with the selected pixel block of the current frame to determine whether a match exists between any pixel block of the reference frame having a feature with a value that is within a predetermined range of a value of the same feature for the selected pixel block of the current frame, wherein the processor is further configured to conduct the feature oriented search by:

determining a sums of block (SD) value for pixel blocks within the reference frame, wherein each SD value for a pixel block of the reference frame comprises an absolute value of a difference between a sum of pixel values in the reference block and a sum of pixel values in the selected pixel block of the current frame, and each pixel value is a quantified value of a feature for the pixel associated with the pixel value; and ordering the feature oriented search within the reference frame so as to compare pixel blocks of the reference frame having lower SD values with the selected pixel block of the current frame prior to comparing pixel blocks of the reference frame having higher SD values with the selected pixel block of the current frame.

8. The apparatus of claim 7, further comprising an interface unit configured to establish a collaboration session between the apparatus and a computing device, wherein the apparatus shares the screen content with the computing device.

9. The apparatus of claim 7, wherein the processor is further configured to search along at least two predetermined directions within the search window of the reference frame during the direction based search.

10. The apparatus of claim 7, wherein the processor is further configured to determine that a match exists during the direction based search based upon a comparison of pixel values between a candidate pixel block of the reference frame and corresponding pixel values of the selected pixel block of the current frame, where a difference between pixel values of the candidate pixel block of the reference frame and the pixel block of the current frame falls within a predetermined range of values.

11. The apparatus of claim 7, wherein each pixel value comprises a luminance value of the pixel associated with the pixel value.

12. The apparatus of claim 7, wherein the processor is further configured to terminate the feature oriented search when at least one pixel block of the reference frame is reached during the ordered search that has a SD value greater than a threshold value.

13. One or more computer readable storage devices encoded with software comprising computer executable instructions and when the software is executed operable to:

find a suitable predictor that is used to code pixel blocks from one or more frames in a plurality of video frames of screen content that is displayed by a computing device, by:

selecting a pixel block of a current frame;

conducting a direction based search by comparing pixel blocks along at least one predetermined direction within a search window of a reference frame with the selected pixel block of the current frame to determine whether a match exists between a pixel block of the reference frame and the selected pixel block of the current frame; and in response to a determination that no sufficient match has been found between any pixel block within the search window of the reference frame and the selected pixel block of the current frame from the direction based search, conducting a feature oriented search by comparing pixel blocks of the reference frame with the selected pixel block of the current frame to determine whether a match exists between any pixel block of the reference frame having a feature with a value that is within a predetermined range of a value of the same feature for the selected pixel block of the current frame, wherein the instructions are further operable to conduct the feature oriented search by:

determining a sums of block (SD) value for pixel blocks within the reference frame, wherein each SD value for a pixel block of the reference frame comprises an absolute value of a difference between a sum of pixel values in the reference block and a sum of pixel values in the selected pixel block of the current frame, and each pixel value is a quantified value of a feature for the pixel associated with the pixel value; and ordering the feature oriented search within the reference frame so as to compare pixel blocks of the reference frame having lower SD values with the selected pixel block of the current frame prior to comparing pixel blocks of the reference frame having higher SD values with the selected pixel block of the current frame.

14. The one or more computer readable storage devices of claim 13, and further comprising instructions that are operable to establish a collaboration session between a first computing device and a second computing device, wherein the first computing device shares screen content that is displayed by the first computing device with the second computing device.

15. The one or more computer readable storage devices of claim 13, and further comprising instructions that are operable to search along at least two predetermined directions within the search window of the reference frame during the direction based search.

16. The one or more computer readable storage devices of claim 13, and further comprising instructions that are operable to determine that a match exists during the direction based search based upon a comparison of pixel values between a candidate pixel block of the reference frame and corresponding pixel values of the selected pixel block of the current frame, where a difference between pixel values of the candidate pixel block of the reference frame and the pixel block of the current frame falls within a predetermined range of values.

17. The one or more computer readable storage devices of claim 13, wherein each pixel value comprises a luminance value of the pixel associated with the pixel value.

18. The one or more computer readable storage devices of claim 13, and further comprising instructions that are operable to terminate the feature oriented search when at least one pixel block of the reference frame is reached during the ordered search that has a SD value greater than a threshold value.

* * * * *